United States Patent [19]

Hubbard

[11] 4,215,173

[45] Jul. 29, 1980

[54] BONDED JOINTS AND METHOD AND MATERIAL FOR FORMING SAME

[75] Inventor: Dolph E. Hubbard, San Jose, Calif.

[73] Assignee: Pacer Technology and Resources, Campbell, Calif.

[21] Appl. No.: 931,479

[22] Filed: Aug. 7, 1978

[51] Int. Cl.$^2$ .................. B32B 5/16; B32B 23/08; C09J 5/04

[52] U.S. Cl. .................. 428/331; 156/315; 156/327; 427/203; 427/291; 427/208.8; 427/325; 427/369; 428/355; 428/507; 428/511; 428/514

[58] Field of Search .............. 428/331, 507, 511, 514, 428/355; 427/203, 207 D, 291, 325, 369; 156/315, 327

[56] References Cited

U.S. PATENT DOCUMENTS 3,733,215  5/1973  Paesschen et al. ............. 428/331 X
3,896,253  7/1975  Elmer ........................... 428/331 X
4,145,478  3/1979  Beauchamp .................... 428/511 X Primary Examiner—Thomas J. Herbert, Jr.
Attorney, Agent, or Firm—Cahill, Sutton & Thomas

[57] ABSTRACT

Adhesive bonds between materials, such as woods having porous surfaces, formed by polymerizing in situ alphacyanoacrylate monomers, are accelerated in curing and strengthened by precoating the surfaces to be joined with a solid mixture of alkaline or basic accelerator, such as sodium or potassium hydroxide or sodium borosilicate spheres of micro-size, combined in a chalkable calcareous binder to form a light but adhesive permeable coating, before the monomeric adhesive is applied. The latter permeates in part through the light precoating to bond into the wood and is accelerated in its polymerization so that it is not excessively absorbed into the porous substrate, resulting in a bond of superior strength.

9 Claims, No Drawings

BONDED JOINTS AND METHOD AND MATERIAL FOR FORMING SAME

The present invention relates to improved bonded joints in porous materials, such as certain open grained woods and the like, made by polymerizing in situ the monomers or co-monomers of alphacyanoacrylates while the parts are held in assembled position. It is well known in the prior art that monomers of this type form good bonding resins or adhesives. They have been used successfully in the past for bonding together non-porous materials such as metals, certain plastics, rubber, and the like, but they have not been found very useful for bonding porous materials such as open grained woods, e.g. walnut, ash, fir, or even some of the closer grained woods such as oak, maple, and birch, etc. The reason for this, apparently, is that the adhesive materials, which are applied in monomeric form (or as comonomers) are quite fluid and are quickly taken into the pores by capillary action so that a good bond does not materialize between the parts to be joined. Also, it seems that at least some of the woods, and probably most of them, are at least slightly acidic and the acid reaction with the monomer material serves to inhibit or at least strongly slow down the polymerizing process which is essential for getting a strong bond.

The viscosity of the monomeric material as applied, is a factor, and various materials have been added to the monomers to control their viscosity and hence to limit their absorption which occurs so quickly, in many cases, that a good polymer of effective bonding strength has not been obtainable.

It has also been known to use various liquid accelerators preapplied to the bonding surface or added to the monomers to speed up polymerization; some of these aggravate the problem, being even more quickly absorbed into the wood than the monomers. Other accelerators are suspended in aerosol propellants which are expensive, and often hazardous or otherwise objectionable. For these and other reasons, the alphacyanoacrylic resins have not been as successful for many uses as would be desirable, even though they have been widely adopted and used for other purposes.

It is also difficult, in many cases, to form perfectly matching surfaces on many materials that are to be joined. This is particularly true in connection with laminated articles or those fabricated from pieces of wood. In hobby craft, for example, in the making of model airplanes, automobiles, trains, etc., many small gluing operations are involved for which the alphacyanoarylic resins would be very desirable except for the objections noted above. In assemblying electronic circuitry, in pattern making, and in many other situations, the need to have a quick setting adhesive, easily applied and taking firm hold quickly enough to avoid delay, while not so fast as to interfere with proper assembly, is quite obvious.

The present invention has for a major object the formation of strong joints between porous parts to be fastened together, and a procedure and material for accomplishing such at small expense and with convenience. One aspect of the invention includes the discovery of a simple but effective solid accelerator which can easily and accurately be applied to the surface before the monomer is applied. Such accelerator material can readily be prepared from inexpensive and widely available materials. The method of application is simple and, in fact, the whole bond-forming operation is made simpler and the bond itself is much improved.

Alphacyanoacrylic resins of the type usable in the present invention have the general formula:

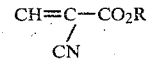

where "R" represents either an alkenyl having 2 to 6 carbon atoms, or cyclohexyl, phenyl, or an alkyl group having 1 to 16 carbon atoms. Particularly preferred for coating adhesives are the ethyl or methyl cyanoacrylates having viscosities in the range of 20 to 90 cps. preferably about 40 to 60 centipoises (cps.). Examples of such commercial product monomers are the alpha cyanoacrylates available from Pacer Technology and Resources Co., U.S.A., marketed by Pro-tel and called "Bondini" having a viscosity of about 40 cps, and a similar product produced by the same company and marketed under the tradename "X-30". Another product, available from the same source is called "Zap", being understood to be an alpha ethylcyanoacrylate having a viscosity, as monomer, of 1 to 2 cps. Of these two products, the more viscous is preferred in a procedure described below where the adhesive is spread mechanically on the substrate, i.e. by normal gluing or coating processes, and the less viscous monomer is preferred where the bonding agent is to be applied by wicking, depending on capillary attraction to draw the monomer into the area to be bonded.

It is conventional practice to modify or control the viscosity of the monomers by addition of a suitable thickener, such as simple polyacrylates, or poly (methylmethacrylate), or copolymers of these with the polyalphacyanoacrylates themselves. Other thickeners, such as cellulose acetate and the the like may be used in some cases. Generally, the amount of thickener to be used is determined by the particular application or manner of applying to the work. For small quantity sales to ultimate consumers, the viscosity of commercial monomer may range from as low as 1 to as high as 120 cps., the range of 20 to 40 cps. being generally preferred when the coating is applied directly to the area to be bonded. However, for some methods of use, the adhesive compositions may have viscosities in the lower range (1 to 30 cps.) Those in medium range (31 to 120 cps.) or even in the high range of 121 to 2000 cps. may be used on some porous substrates. Other things being equal, the higher the viscosity the better, provided that the bonding agent can be properly applied and spread and the parts assembled before it set up too firmly. Setting time is often critical to efficient production. A merit of the alphacyanoacrylates is that they are fast setting and have high strengths when properly applied and cured.

Numerous variations have been made in the alphacyanoacrylates that are now available commercially. Their producers have made many claims as to their usefulness but their application to porous materials, such as the open grain woods, has remained a chronic problem. It is an aim of the present invention to provide a way to solve this problem.

An important aspect of the present invention is a solid polymerization accelerator which can be applied by rubbing it over the surface of the porous substrate prior to application of the monomeric alphacyanoacrylate that is to solidify as bonding agent. It was noted above that liquid or aerosol accelerators are well known in the art for hastening the hardening of these resins; according to the present invention, however, the accelerator is a novel solid composition, adapted to be applied by rubbing it over the surface to be bonded. It consists of a solid mixture of a normally solid accelerator with a chalkable carrier that also is normally solid, the solid mixture being worn away as it is deposited by friction on the surface of the porous substrate. The specific compositions used will be given more fully hereinbelow.

Another aspect of the present invention is the procedure used to accomplish the desired deposition and curing of the bonding agent at the precise area and in the particular quantities desired for most effective bonding. With non-porous substrates, as already suggested, the flow of the applied monomer, and its rate and degree of curing as polymerization proceeds, can be predicted with some reliability. Two metal plates, for example, can be bonded together by applying a simple coating of monomer to one or both, the pressing the plates together and allowing the coating to polymerize and be cured. Flow of the liquid, on application, as well as movement of the liquid film when the plates are brought together also can be predicted with reasonable accuracy. This is not the case when two porous substrates, such as layers or particles of open grained wood, are to be secured together. Depending greatly on the viscosity of the monomer, as well as upon size and number of pores, the applied liquid may be almost or entirely absorbed into the wood and hence may not form a bond layer at all. Or it may spread unevenly over the surface, so that an uneven and inadequate bond is made. There may be such variations in spacing between the substrates that capillary forces pull an excess of monomer into certain areas and leave little or none in others. By precoating the surfaces with the solid mixture which incorporates the accelerator, these inequalities are at least partly removed and the liquid layer which is to set up and form the bond can be applied much more evenly to assure a sound bond.

The bond itself appears to have novel and important features which will be appreciated from the full description of the preferred embodiment of the invention which follows.

The invention will be particularly described as applied to layers, particles or blocks of open grained wood, such as walnut, oak, fir, and others, but it will be understood that the invention is just as applicable to other porous materials or substrates as it is to these particular materials. It will be understood that the adhesive substance or bonding agent itself is not novel, although its use in combination with other steps of the process is believed to be.

The accelerator and its preparation will first be described. It consists of a normally solid alkaline substance, or one that at least is basic in reaction, such as sodium hydroxide, potassium hydroxide or fine hollow sodium-borosilicate micro spheres, which are well known for many chemical applications or other similar inorganic basic salts of analogous properties.

The chosen accelerator is mixed dry, in proportions which may vary from 0.5 to 9.5 parts by weight of accelerator to 9.5 to 0.5 parts by weight of an inert and normally solid calcareous binder, such as gypsum (Plaster of Paris), calcium carbonate, potassium carbonate, Keene's cement, Parian cement, Martin's cement, Spence's plaster, or the like, as long as the mixture, after full preparation and drying, as will be described, is a firm but chalking mass. That is, the final dry mix is to have the property of eroding and depositing a thin layer on the porous substrates as it is rubbed over them, analogous to the wearing away of a stick of chalk on a chalkboard. The above materials, in dry powdered condition, are first intimately mixed together. This may be accomplished manually or mechanically, in a mortar and pestle or in any mechanical mixer. Water is then added to the mix, in proportions of about 1 to 2.5 parts by weight to one part of the dry mix and the thick amorphous paste or mass which results is completely stirred until no dry particles remain. Thereafter, the mix is placed in molds to produce sticks or blocks of suitable size for convenient handling and is thoroughly dried by heating moderately, either in an oven or over an open flame. A mild heat may suffice, although it may be heated above the boiling point of water. e.g. a heating temperature may be between about 40° C. and 130° C. The heat should not be sufficient to cause any decomposition of the accelerator. Heating may be done under vacuum if desired. However, at elevated temperatures with high vacuum, bubbles may occur and these should be avoided. A preferred method is to heat over open flame or in an oven at about 75° C. and at atmospheric pressure for a suitable time, up to 24 hours or until all the water is driven off. Vacuum between about 500 and 700 torr. (mm. of mercury) can be used for faster curing in some cases if the temperature is not too high.

The resulting product is a fairly hard but low density and fine grained solid which can easily be stored and will keep indefinitely. It is somewhat hygroscopic and should be kept out of direct contact with moisture. However, if it becomes somewhat moist, it can readily be dried by moderate heating.

Several methods may be used to apply the accelerator to the material to be bonded. In essence they all require relative rubbing of the block or stick across or over the surface to be bonded of the substrate, to deposit by erosion a thin layer of the solid material. In this process, some of the dry mix may be left as a loose powder on the surface treated. If so, this should be removed by lightly blowing across the surface, or using a low velocity stream of air from any source. Both surfaces to be joined are treated in this manner. A thin uniform layer of the dry mix should then cover both of the substrates. This layer should be fairly continuous but somewhat open or porous and may fill or partly fill minor surface pores or irregularities.

The monomeric bonding agent is next applied as a coating, usually to only one of the surfaces to be joined, although it may be applied to both, if desired. Preferably this is a monomer of the alphacyanoacrylate having a viscosity, at temperature of application (normally room temperature) that is between 20 and 90 centipoises (cps). For most woods, the narrower viscosity range of 40 to 60 cps is preferred. The second piece or layer is quickly applied, before the adhesive sets up. Once the parts are put together, they should not be moved, as polymerization sets in immediately and disturbance will weaken the bond. Between the usual types of wood surfaces treated in this manner, the bond will set up quite firmly in 5 to 45 seconds of time, which is about twice to twelve times as fast as the same material will set up in the absence of the accelerator.

For some applications, a second or alternative method may be used, taking advantage of capillary action to pull the adhesive film into place. This method is particularly suitable for use with low viscosity alphacyanoacrylates, such as the ethyl- and methyl-cyanoacrylates specifically mentioned above. It is useful where the bonding film need not necessarily be continuous or where the areas to be joined are narrow. In this procedure, the parts are first coated with the dry mix accelerator, as described above. Then they are put together in the desired assembled relationship, e.g., as laminate, or as pieces to be glued, before any adhesive is applied. The thin and nonviscous monomer is then applied, as with a brush or dauber, around the periphery of the joint continuously or in as many places as possible so as to "wick" or draw into the joint by capillary attraction. The surface tensions of the low viscosity bonding agents of this type are excellent for this type of application, causing them to wick into place very well. However, if the material being bonded is quite porous, the coating method described above, using a somewhat more viscous monomer, may be preferable. With most of the available alphacyanoacrylates, those having viscosity within the range of about 1 to 20 cps are preferred for the wicking method. Setting times usually will be between about 5 to 30 seconds.

For maximum bond strength, a combination of the two methods just described may be used. That is, the surfaces are first treated with the accelerator mix, to coat them lightly with the solid powdered mass. Then at least one of them is coated with a medium viscosity monomer, 20 to 90 cps viscosity, and the parts to be bonded are put together under suitable pressure. This bond sets up quite rapidly (in five to 45 seconds, as noted above). It may then be supplemented by coating the peripheral edge of the joining, as described above, with the lower visocsity bonding agent, 1 to 20 cps, to wick into and fill areas not adequately filled by the first or coating treatment. A very strong bond can be produced in this way, one that is sealed well around its periphery. Most woods, bonded in this manner, will fail in the wood rather than at the joint if force is applied to separate them.

The superiority of this process appears in several areas or respects. The joint is strong, wicking of paint or other liquids later applied is largely inhibited and minor gaps between parts that are joined are pretty well eliminated. The accelerator mix itself tends to fill some of the minor voids; it also enhances polymerization of the monomer that flows into these voids. A rapid setting time is achieved to facilitate production. There is little or no encapsulation of the type which often occurs in prior art joints, using the same bonding agents.

In most applications, where low porosity materials are used, wicking is not a problem. The low porous materials, such as most metal products, rubbers and many of the synthetic resins do not present a problem and simple coating, with thin films, without use of the precoated solid accelerator, is usually all that is required. The present invention is intended primarily for the porous woods and similar materials. With such materials, the adhesive is too quickly absorbed into the substrate, when the solid accelerator mix is not used, so that a bond forming film is never established. Or else the monomer in thicker film does not polymerize rapidly enough for good production of strong bonds. Capillary action in open grained woods is partially inhibited by the coating of the solid accelerator mix, according to the present invention, and the monomer is also cured much more quickly. The solid material avoids or reduces the excessive wicking characteristic of these porous substrates.

As suggested above, it is known in the art to use liquid chemical accelerators; these are often applied by spraying with a propellant onto the surface to be coated. These accelerators do not partially fill or cover the pores but are absorbed into them so that capillary action is not impeded. Also, there is no gap filling between ill fitted parts. With the present invention, the solid mix itself partially fills these and its presence in excess in the larger gaps or voids assures rapid polymerization, even where the film of adhesive is of greater than usual thickness. The liquid and aerosol types of accelerators of the prior art have been used on porous materials such as paper, wood and cermaics. They are too rapidly absorbed or wicked into the porous materials themselves to form strong bonds as they do not hinder wicking of the adhesive. Poor gap filling takes place.

The curing rate is important. Too fast a cure, or too much or too strong an accelerator results in encapsulation of the adhesive. That is, the monomer solidifies around a "site" of accelerator to enclose it. Such a process produces short chain polymers, which form weak bonds. Low molecular weight polymers are not good bonding agents for woods where bond strength is important. On the other hand, a very slow cure may result in good bond strength, but it limits production greatly and often this cannot be tolerated. In many applications, a cure rate of one minute or more is much too long for use in practice. The thin film of solid matter provided by the solid accelerator mix of the present invention facilitates use of a thinner film of applied monomer liquid, which inhibits wicking. It also cuts monomer requirements somewhat, although this may be a minor factor. In addition, the thin film of applied solid is only semi-permeable to the monomer in this invention, because of the difference in polarity of monomer and solid film. Because of this, the main body of adhesive is repelled or held back somewhat from excessive penetration into the pores. It remains in place to form a main body or layer of adhesive, available at the joint plane or situs to polymerize into a strong bond. It still allows part of the monomer to wick or penetrate somewhat into the pores of the substrate before polymerization, giving extra strength to the bond. When the second surface or part is applied, preferably under pressure, the bulk of the coating of adhesive is thinned out into a film of large surface area and is forced to some extent into the pores with closer contact with the accelerator, forming a strong bond. A good seal as well as a good bond is formed between the substrates.

In summary, without use of the solid accelerator of this invention, the total area between adhesive and substrate is lessened, hindering formation of a strong bond. With the use of the partially gap-filling solid accelerator mix, the total area of contact between adhesive and substrate is increased, the bond film is thinner but stronger, and maximum utilization of the adhesive is achieved.

A preferred accelerator composition is hollow microspheres of sodiumborosilicate, 6 to 8 parts, with 2 to 5 parts of Plaster of Paris. Proportions of 7 parts micropheres to 3 parts plaster are preferred. The gypsum (Plaster of Paris) controls the accelerating effect of the spheres, leading to a uniform but rapid polymerization of monomeric alphacyanoacrylates. By varying somewhat the proportions of active accelerator to inert calcareous binder (Plaster of Paris), one can control the rate of polymerization quite accurately. Since the binder is inert, it acts mainly as a diluent, controlling the distribution and concentration of accelerator particles which are accessible at any point to the monomer, thus effectively controlling the polymerization or curing rate.

As mentioned above, encapsulation can be a problem when extremely fast curing takes place. If the adhesive polymerizes rapidly around catalyst particles but does not proceed beyond that point, it tends to produce granules of hard polymer that are not connected as a film or layer. In fact, some of the intended bonding agent may remain substantially in monomeric state. The present invention largely alleviates this problem by increasing the effective area of accelerator as well as adhesive, spreading out the reactive sites.

In production of alphacyanoacrylates, it is common practice to add to them a small minor amount of polymerization inhibitor to preserve them prior to use and thus to increase shelf life. The accelerators of the present invention immediately neutralize or cancel the effect of such inhibitors. The alphacyanoacrylates tend to be too rapidly polymerized by weakly acidic substances, such as water, alcohols, and even some of the amines. Such polymerization produces weak polymers. Small amounts of acidic compounds which occur naturally in various types of wood can also hinder significantly the formation of strong bonds. With the addition of the accelerator-calcareous binder solid mix of the present invention polymerization is better controlled and high weight ultimate polymers are obtained. True curing is speeded up and final strength of the bond is greatly improved. The materials of this invention are easily handled; there is no mixing of accelerator with adhesive just before use; no aerosols or flammable solvent carriers are used. A simple and essentially nontoxic solid replaces hazardous materials. It is applied simply by rubbing on the surface to be bonded. There are no restrictions on shipping these solid mix materials.

The invention is further illustrated by the following particular Example.

EXAMPLE 1

Powdered hollow sodiumborosilicate spheres, in amount of 70 grams weight, were placed in a 9-inch diameter evaporating dish, 5 inches deep. To this was added 30 grams of Plaster of Paris. A mechanical stirrer was fitted and run for 20 minutes, 140 grams of water was added and the mix was stirred until all the solids had been wetted thoroughly. Then the mix was decanted into two 100 mm. by 50 mm. evaporating dishes and these were put into an oven. The mix was dried in the oven at 80° C. for 24 hours. After all the water was removed, the resulting hard granular blocks were broken up into chunks of convenient size for use. These were rubbed over the surfaces of wood blocks that were to be glued together. The chalkable material wore away slowly, leaving a light uniform coating on each of the wood surfaces that were to be joined. A coating of an ethylcyanoacrylate monomer of about 50 cps. viscosity was then applied to one of the surfaces. The other block was placed over it and the two held under a clamping pressure until the bond had set.

As shown in the table below, applications were made to several kinds of wood and with various grain arrangements. In general, the joints having one or both blocks presenting an end grain to the adhesive to be bonded took longer to bond or did not make a firm bond at all, apparently due to the excessive absorbtion of the monomer into the grain of the wood. Results tabulated show comparison setting times for blocks without and with the accelerator being applied before the adhesive.

| Substrate | Grain | Data on Substrates: Without Accelerator | With Accelerator |
| --- | --- | --- | --- |
| Birch | End-End | No Bond | 10-Sec |
|  | End-Side | 45 Sec | 5–7 Sec |
|  | Side-Side | 40 Sec | 5–7 Sec |
|  | Top-Top | 20 Sec | 4–5 Sec |
| Pine | End-End | No Bond | 12 Sec |
|  | End-Side | No Bond | 10 Sec |
|  | Side-Side | 90 Sec | 10 Sec |
|  | Top-Top | 20 Sec | 5 Sec |
| Ash | End-End | 40 Sec | 25 Sec |
|  | End-Side | 15 Sec | 4–5 Sec |
|  | Top-Top | 15 Sec | 4–5 Sec |
| Walnut | End-End | No Bond | 20 Sec |
|  | End-Side | No Bond | 15 Sec |
|  | Side-Side | 50 Sec | 12 Sec |
|  | Top-Side | 55 Sec | 10–12 Sec |
| Oak | End-End | 75 Sec | 4 Sec |
|  | End-Side | 80 Sec | 2–3 Sec |
|  | Side-Side | 115 Sec | 15 Sec |
|  | Top-Side | 20 Sec | 3 Sec |
| Teak | End-End | 50 Sec | 8 Sec |
|  | End-Side | 20 Sec | 7 Sec |
|  | Side-Side | No Bond | 20 Sec |
|  | Top-Top | 20 Sec | 4 Sec |
| Mahogany | End-End | No Bond | 5 Sec |
|  | End-Side | 120 Sec | 10 Sec |
|  | Side-Side | 20 Sec | 7 Sec |
|  | Top-Top | 22 Sec | 6 Sec |
| Fir | End-End | No Bond | 35 Sec |
|  | End-Side | No Bond | 10 Sec |
|  | Side-Side | No Bond | 10 Sec |
|  | Top-Top | 120 Sec | 12 Sec |
| Spruce | End-End | No Bond | 12 Sec |
|  | End-Side | No Bond | 10 Sec |
|  | Side-Side | 45 Sec | 7 Sec |
|  | Top-Top | 15 Sec | 5 Sec |

A typical joint in porous material, such as wood, is characterized by small projections of the set bonding agent extending from the main bond layer into some of the larger pores, being polymerized to firm bonding condition by reason of the presence of the accelerator present. In cross section, the joint appears as a firm layer of polymer with these minor extensions on either side, all parts of the layer being firmly fixed to the porous wood or analogous surface.

It will be understood that the invention permits of some variations from the specific data and compositions given above and it is intended by the claims that follow to cover the obvious variations and modifications which would occur readily to those skilled in the art as broadly as the state of the prior art properly permits.

I claim:

1. A joint or bond securing opposed substrates of porous materials firmly together, comprising a highly polymerized layer of alphacyanoacrylate resin and having particles of a solid chalkable accelerator intervening between the resin and parts of the adjacent surface of substrate, while parts of said resin extend into the pores of the substrate between particles of said solid accelerator, said solid accelerator comprising 0.5 to 9.5 parts by weight of a basic reacting solid selected from the group which consists of sodium hydroxide, potassium hydroxide and sodium borosilicate hollow microspheres combined with 9.5 to 0.5 parts by weight of an inert chalkable calcareous binder, said solid accelerator having the property of accelerating polymerization of the resin to prevent it soaking unduly into pores of the substrate.

2. A joint according to claim 1 in which the accelerator comprises particles of hollow microspheres of sodiumborosilicate bonded with Plaster of Paris.

3. A method of bonding together substrates of porous materials, such as open grained wood which are normally poorly bonded by resinous polymeric alphacyanoacrylates, which comprises, in combination, the steps of:
  (a) applying to the substrates to be joined a light open or porous precoating of a chalkable solid accelerator composed of 0.5 to 9.5 parts by weight of a basic reacting solid material selected from the group which consists of sodium hydroxide, potassium hydroxide and sodium borosilicate hollow microspheres;
  (b) thereafter applying a coating of polymerizable monomeric alphacyanoacrylate to at least one of the surfaces of substrate to overlie and partially penetrate through the accelerator coating into pores of the substrate; and
  (c) holding the substrates with their bonding surfaces facing under pressure while the alphacyanoacrylate polymerizes to high molecular weight.

4. A method according to claim 3 in which the accelerator comprises solid hollow microspheres of sodiumborosilicate bonded into the chalkable mixture and applied in such a way as to permit flow of the monomer into pores of the porous material.

5. A method according to claim 3 in which the monomer is an ethylcyanoacrylate of viscosity between 20 and 90 centipoises at the time of application.

6. An accelerator in solid chalkable form composition for curing alphacyanoacrylate monomers to high molecular weight polymer for purposes of bonding together substrates which are porous in nature, such as open grained woods and the like, which comprises a dry solid mixture of a basic accelerator selected from the group which consists of sodiumborosilicate in hollow microspherical particles, sodium hydroxide, and potassium hydroxide and mixtures of any two or more of these, in proportions of 0.5 to 9.5 parts by weight, combined with 9.5 to 0.5 parts by weight of a chalkable calcareous binder suitable for deposition by chalking of a thin firm layer of said mixture by rubbing over a surface of the porous material to be bonded.

7. Composition according to claim 6 which consists of about 70 parts by weight of sodiumborosilicate hollow microspheres combined with about 30 parts by weight of Plaster of Paris.

8. Composition according to claim 6 in which the accelerator solid is hollow microspherical particles of sodiumborosilicate.

9. Composition according to claim 8 in which the proportions of the accelerator are about 4 to 6 parts, to three to four parts of binder.

* * * * *